No. 728,772. PATENTED MAY 19, 1903.
L. SCONFIETTI.
MOISTENING, COOLING, OR HEATING THE AIR IN FACTORIES, WORKROOMS, OR THE LIKE.
APPLICATION FILED JAN. 3, 1901.
NO MODEL.
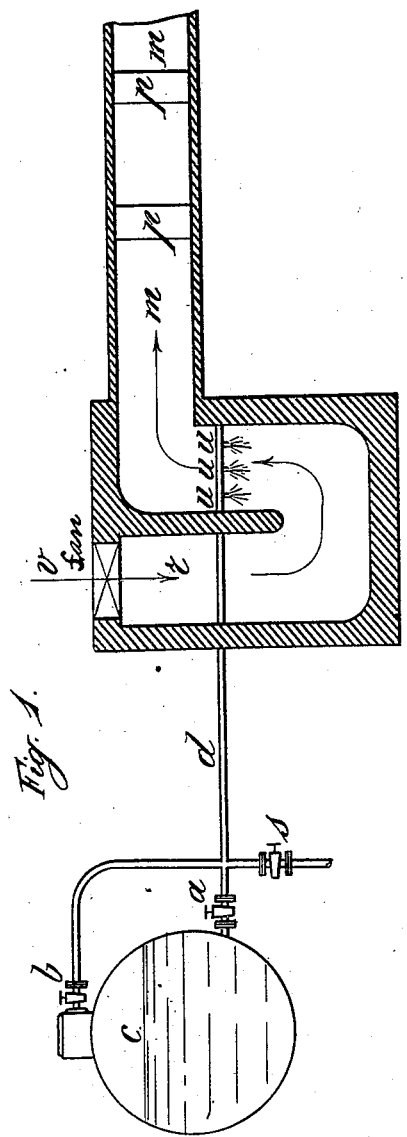
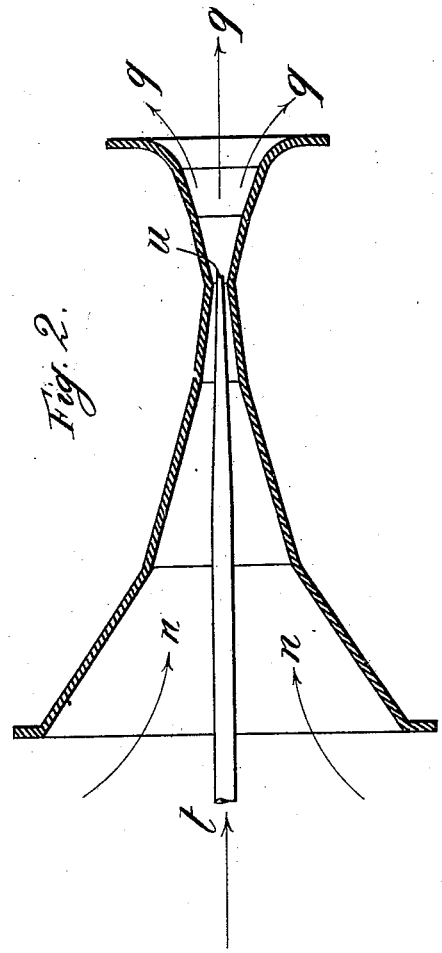
Witnesses:
Inventor
Leopold Sconfietti
By Diedesheim & Fairbanks
Attorneys.

No. 728,772. Patented May 19, 1903.

UNITED STATES PATENT OFFICE.

LEOPOLDO SCONFIETTI, OF LEGNANO, ITALY.

MOISTENING, COOLING, OR HEATING THE AIR IN FACTORIES, WORKROOMS, OR THE LIKE.

SPECIFICATION forming part of Letters Patent No. 728,772, dated May 19, 1903.

Application filed January 3, 1901. Serial No. 42,010. (No model.)

*To all whom it may concern:*

Be it known that I, LEOPOLDO SCONFIETTI, mechanical engineer, a subject of the King of Italy, residing at Contonificio Cantoni, Legnano, Lombardy, Kingdom of Italy, have invented certain new and useful Improvements Relating to Moistening, Cooling, or Heating the Air in Factories, Workrooms, or the Like, of which the following is a specification.

This invention relates to the moistening, cooling, or heating of the air in factories, workrooms, and the like.

If water is heated in a closed vessel—for example, in a steam-generator—above a temperature of 100° centigrade and if the water does not entirely fill the vessel, a portion of it is transformed into steam, while the remaining portion remains in the liquid state, having the same temperature as the steam, such temperature varying according to the existing pressure in the vessel.

The water taken from an ordinary steam-boiler having a pressure above that of the atmosphere has a temperature higher than 100° centigrade—that is to say, higher than the boiling-point under atmospheric pressure. If under these conditions of pressure and temperature the molecules of water are suddenly introduced in a space having a lower pressure—for example, the atmosphere—the said molecules can no longer remain in the liquid state, they being transformed into steam by taking the necessary heat for this transformation from the air surrounding it at the moment of transforming into steam. This absorption of heat produces a remarkable cooling of the air surrounding the molecules of water, as also the ambient air, while the steam which is being produced becomes absorbed by the air and so moistens the same. Thus the two effects of moistening and cooling the air are obtained simultaneously, and this is exactly the object of this invention. For this purpose the transformation of the steam from water is utilized which takes place when a sudden lowering of pressure is produced.

According to this invention I provide a supply-pipe by means of which water is taken from a boiler or other vessel containing water at a pressure above that of the atmosphere and heated to a temperature equal or above the corresponding temperature of the internal pressure in accordance with the tables by Regnault. The mouth of the pipe must be situated below the lowest water-level of the boiler.

The water must be pure. In the contrary case it must be filtered or otherwise deprived of its impurities.

The water on arriving at the place for vaporization (which may be the room which it is desired to moisten) escapes into the atmosphere in form of small jets, owing to the pressure in the boiler, the water being by preference atomized by means of suitable nozzles in connection with the water-supply pipe. The said atomizing-nozzles or the like allow the water to escape in form of a fine spray or mist, which on coming into contact with the ambient air becomes immediately transformed into steam.

With the aid of a fan or other blowing apparatus a strong air-current is created, so as to cause the air to envelop each particle of water at the very moment when it comes into contact with the atmosphere, which latter gives up to it the heat required for its transformation into steam and then absorbs this steam in proportion as it is formed.

The quantity of air blown through the mist of atomized water must be sufficient to absorb all the steam evolved without attaining the point of saturation. Practical experiments will enable a graduated table to be prepared, giving the respective proportions of water and air to be used for obtaining the most convenient degree of moisture for various trades. The air thus charged with moisture and highly cooled, owing to the evaporation effected at the expense of the amount of heat present, is introduced direct into the locality which it is desired to provide with moist and cool air, or it may be taken there and distributed by means of channels or orifices appropriately disposed in the manner usually adopted for heating and ventilating systems.

The annexed drawings show, in Figure 1, an example of carrying the invention into effect. In this figure, $c$ is the steam-boiler; $a$, the supply-tap for the water, arranged below the lowest level of the boiler-water. $b$ is the steam-cock; $s$, the water-cleaning cock; $d$, the supply-pipe for the water and steam. $u\ u\ u$ are the atomizing-nozzles, producing jets in a downward direction. $v$ is a ventilator for forcing air into the chamber $r$ and thence across the mist of water formed by the nozzles $u$ into the channel $m\ m$, where the air-current subdivides and enters, appropriately moistened, through orifices $p\ p$, into the room or the like.

The nozzles are provided with taps to enable a greater or lesser number of them to be in action, according to the degree of moisture in the external air and that which it is desired to impart. This arrangement may serve in summer-time for both moistening and for cooling the air. In winter, on the contrary, it may be desired to increase the temperature of the ambient air. Nozzles $u$ are caused to deliver a mixture of water and steam from the conduit $d$ by suitably regulating the water and the steam-tap $a$ and $b$, respectively.

Generally speaking, the temperature of the ambient air may be lowered, or maintained at the same temperature, or increased, and always be charged with moisture to a certain degree, according to whether only hot water is used or whether the latter is mixed more or less with steam. If, for example, the arrangement shown in the drawings is carried out in a practical manner, it is possible to preserve in a room or the like the same hygrometrical and thermometrical conditions during all the seasons of the year, independently of any variations in the moisture of the atmosphere. By these improved means the most favorable conditions may be obtained both with regard to the health of the workers as also with regard to the industrial work, and with a minimum of cost for installation and repairs.

The invention may also be applied by means of apparatus similar to an injector or ejector, either of which will enable the moistening and the cooling of the air to be effected in the manner hereinbefore stated. A suitable apparatus of this description is shown in Fig. 2.

From the extremity of the tube $t$, which supplies hot water under pressure and which terminates in an atomizing-nozzle $u$, there flows a very fine jet, which draws into the interior of an injector air, as indicated by the arrows $n\ n$, and so mixes intimately with the jet $u$ and allows it to pass out at $q$ in a moist and cool condition. If by means of a fan or other blast apparatus the introduction of air into the apparatus is increased, more energetic action and better results are obtained.

This invention may be applied to any humidifying apparatus with water-jet and also to those commonly suspended to the ceilings of the rooms in spinning and weaving mills by reducing the orifice of atomizing-nozzles.

The advantages obtained from the application of this invention are the following: First, the introduction in the workrooms of air charged with steam in the same form as it would acquire the moisture in nature—i. e., under hygienic conditions—and not in the form of minute water-drops suspended in the air, which latter would tend to wet the persons and objects and is injurious to the health of the former and to the maintenance of the machines; second, an effective refrigeration of the air for the purpose of cooling the workrooms; third, a remarkable economy in the installation and the maintenance, as there are no pumps required, and also owing to the use of the exact quantity of water which the ambient air is capable of absorbing. In ordinary apparatus, on the contrary, only a very small quantity (about three to five per cent., at most) of the water injected is utilized, and this only in an imperfect manner. It follows that by operating in the manner indicated a single nozzle suffices for replacing twenty to thirty orifices of an ordinary injecting apparatus for humidifying purposes.

What I claim, and desire to secure by Letters Patent of the United States, is—

The herein-described process for cooling air and charging it with moisture, which consists in heating water at a pressure above that of the atmosphere to a temperature higher than that of the boiling-point under atmospheric pressure, suddenly introducing such water into a space having a lower pressure to transform it into steam to simultaneously moisten and cool a strong current of air which is maintained in said space of lower pressure and caused to traverse the path of introduced water, and finally subdividing the air-current and conveying the parts to the localities in which the same is to be used.

In testimony whereof I have hereunto set my hand, in presence of two subscribing witnesses, this 13th day of December, 1900.

LEOPOLDO SCONFIETTI.

Witnesses:
VIRGINIO CARNEVALI,
MICHELE DE DRAGO.